United States Patent Office 3,843,567
Patented Oct. 22, 1974

3,843,567
CHELATING AMINO ACID ADDITION POLYMER
Yoshiki Matsunaga, Sagamihara, and Takaharu Itagaki, Yoshimichi Kobayashi, and Tsuguo Katsuura, Yokohama, Japan, assignors to Mitsubishi Chemical Industries, Limited, Tokyo, Japan
No Drawing. Filed Nov. 30, 1972, Ser. No. 310,818
Int. Cl. C08g 33/06
U.S. Cl. 260—2.2 R
8 Claims

ABSTRACT OF THE DISCLOSURE

A chelating amino acid addition polymer which selectively removes heavy metal ions from solution is obtained by a process which comprises reacting an acryloyl compound containing at least two acryloyl groups with an amino acid containing at least two active hydrogen atoms bonded to the nitrogen atom of the amino acid.

BACKGROUND OF THE INVENTION

Field Of The Invention

This invention relates to a chelating amino acid addition polymer. More particularly, it relates to a chelating amino acid addition polymer containing amino acid units. It also relates to a new use of the addition polymer.

Description Of The Prior Art

Recently, environmental considerations have initiated interest in the removal of heavy metals from the drainage of mining or chemical factories to prevent pollution. In order to remove heavy metals from drainage solutions, various methods of control have been proposed. These methods include control of the pH of the drainage solutions so as to precipitate the metals as hydroxides or to adsorb the metals on ion-exchange resins. A difficulty is encountered in the former method in that it is difficult to prevent the retention of a small amount of the heavy metal ions and filtration of the metal hydroxides is not easy. The latter method is characterized by the difficulty encountered in selectively attempting to adsorb metal ions because of the presence of other metal ions. Other attempts to remove metal ions have involved the use of chelating compounds. However, when conventional chelating agents, such as ethylenediamine tetraacetic acid, nitrilotriacetic acid and the like are complexed with heavy metal ions, water soluble complexes are formed. Solutions containing these chelating agents which may act as detergents can be used for some purposes. However, the chelating agents cannot be used to remove heavy metal ions from aqueous solutions.

A need therefore exists for a method by which heavy metal ions may be effectively and selectively removed from solution. The present invention is an attempt to overcome the disadvantages of the conventional treating agents by developing suitable agents which selectively and effectively remove heavy metal ions from an aqueous solution.

SUMMARY OF THE INVENTION

Accordingly, it is an object of this invention to provide a chelating amino acid addition polymer which has excellent chelating properties.

It is another object of this invention to provide a process for removing a heavy metal compound from an aqueous solution with a chelating amino acid addition polymer.

Briefly, these objects and other objects of this invention, as hereinafter will become apparent, can be attained by providing a chelating amino acid addition polymer which is prepared by the addition-polymerization of an acryloyl compound containing a number of acryloyl groups having the formula:

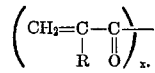

wherein R represents hydrogen or hydrocarbon residual groups and X is $\geq 2$, with an amino acid residue containing Y number of active hydrogen atoms capable of undergoing the Michael addition reaction wherein Y is $\geq 2$.

DESCRIPTION OF PREFERRED EMBODIMENTS

The Michael addition reaction or the Michael condensation reaction is a well known general type of reaction in which one compound containing an active hydrogen adds across a reactive carbon-carbon double bond. In this invention, the Michael addition reaction is used to synthesize a linear polymer containing the repeating units:

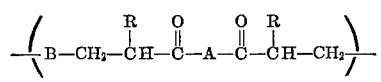

by reacting a compound containing two acryloyl groups:

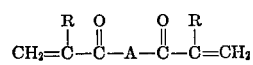

with an amino acid compound containing at least two active hydrogen atoms, H—B—H. The resulting polymer is water soluble, and the amino acid residues of the polymer are capable of forming chelates with metals. When the polymer is reacted with an aqueous solution containing heavy metal ions, complexes of the metals are formed which are insoluble in water and precipitate out of solution. When polymers are formed of at least one acryloyl compound and an amino acid wherein the sum of the reactive groups is at least three, i.e., $X+Y \geq 4$, three types of combinations of the acryloyl compound and the amino acid can be classified.

The first combination involves the reaction of an acryloyl compound containing at least three acryloyl groups with an amino acid containing at least three active hydrogen atoms. The second combination involves the reaction of an acryloyl compound containing two acryloyl groups with an amino acid containing at least three active hydrogen atoms. The third combination involves the reaction of an acryloyl compound containing at least three acryloyl groups with an amino acid containing two active hydrogen atoms. However, in more complicated cases, instead of using amino acid compounds containing at least three active groups, mixtures of an amino acid compound containing two active groups and said trifunctionally active amino acid compound can be used. For example, in the first and second combinations, lysine, which has at least three active hydrogen atoms, and glycine, which has two active hydrogen atoms, are combined. In all three combinations, it is possible to combine an auxiliary cross-linking agent, which in itself has at least three reactive hydrogen atoms capable of undergoing the Michael addition reaction, with an amino acid. Suitable cross-linking agents include N-unsubstituted diamine triols, trithiols, and the like.

In all cases, the polymers of this invention are water insoluble because of the two-and three-dimensional cross-linking which occurs. The polymer of this invention can be synthesized by the following process. In the addition polymerization of an acryloyl compound containing at least two acryloyl groups and an amino acid containing at least two hydrogen atoms reactive in the Michael addition reaction, if the total number of equivalents of the acryloyl groups is greater than the total number of equivalents of the reactive hydrogen atoms in the amino acid (if A moles of the acryloyl compound and B moles of the amino acid are used, $AX>BY$), an addition polymer is obtained which has unreacted acryloyl groups at the terminals of the polymer chain. If the resulting polymer is radically polymerized in the presence or in the absence of a comonomer, or if it undergoes an addition polymerization reaction with a compound containing at least three reactive hydrogen atoms, a polymer can be obtained via the Michael reaction which has a three-dimensional structure. If the polymer product obtained is water soluble or a weakly gelated product, one of the aforementioned processes is applied to the product to yield a material which is water insoluble and has a high strength. Thus, the chelating amino acid addition polymers of this invention include the addition polymers of an acryloyl compound and an amino acid, and the modified polymers prepared by conducting a radical polymerization reaction or a Michael reaction on the basic linear chelating polymer.

Suitable acryloyl compounds of this invention contain at least two acryloyl groups per molecule and include alkylene bisacryl-amides and akylene bismethacryl-amides. These compounds may be produced by the reaction of:

(a) formaldehyde with acryl-amide or methacryl-amide or (b) alkylene-diamine with acrylic or methacrylic acid or esters thereof.

Other suitable acryloyl compounds also include substituted methylene bisacryl-amides and substituted methylene, bismethacryl-amides which may be produced by the reaction of:

(a) an aldehyde having at least two carbon atoms with an acryl-amide or methacryl-amide, or a (b) ketone acetal with acryl-amide or methacryl-amide; (*Journal Of Polymer Science*, 8, (A–1), 1970–72 (1970)), and dihydroxyalkylene bisacryl-amides, dihydroxyalkylene bismethacrylamides, which may be produced by the reaction of a dialdehyde such as glyoxal with an acrylamide or a methacrylamide, methylene bisacrylamide, methylene bismethacryl-amide, dihydroxy ethylene bisacryl-amide, dihydroxyethylene bismethacryl-amide, and the like.

Other suitable acryloyl compounds also include alkyleneglycol diacrylates and alkyleneglycol dimethacrylates. These compounds may be the reaction products of acrylic acid or methacrylic acid with glycols such as ethyleneglycol, propyleneglycol, butyleneglycol, polyethyleneglycol and polypropyleneglycol and the like and include products such as glycol diacrylate and glycol dimethacrylate.

Still other suitable acryloyl compounds include derivatives of 1,3-bis(acrylamidomethyl)-2-imidazolidone, hexahydro-s-triazine having two acryloyl groups at the 1- and 3-positions. Acryloyl compounds having at least three acryloyl groups include hexahydro-1,3,5-triacryloyl-s-triazine alkylene polyol-polyacrylates and alkylene polyol-polymethacrylates. These compounds may be the reaction product of a polyol such as glycerine, trimethylol propane, pentaerythritol, sorbitol, and the like with acrylic acid or methacrylic acid. The definition of amino acids containing active hydrogen atoms involves those hydrogen atoms which participate in a Michael addition reaction and include hydrogen atoms bonded to the nitrogen atom of the amino group, active methylene hydrogen atoms, the hydrogen atoms of the —OH group and —SH group, and the like. Amino acids containing two active hydrogen atoms include α-amino acids such as glycine, α-alanine, glutamic acid and aspartic acid; β-amino acids such as β-alanine; and other amino acids such as N,N- (or N,N'-)-dimethyl lysine, ethylenediamine-N,N- (or N,N'-) diacetic acid, N,N-bis[hydroxyethyl] glycine, and the like. Amino acids containing at least three active hydrogen atoms include lysine, alginine, ornithine, threonine, cysteine and serine and the like.

As usual, the Michael reaction is conducted in an organic solvent or an aqueous medium in the presence of an acidic or alkaline compound. Various polymerization conditions may be employed and the reaction is preferably conducted in an aqueous solution. However, the reaction may also be conducted in a polar solvent, which is inert to the reaction conditions, such as the lower alcohols which include methyl alcohol and ethyl alcohol; dimethylformamide; dimethylsulfoxide; esters such as ethyl acetate and methyl acetate; and ketones such as acetone. The reaction may also be conducted in a nonpolar solvent such as a hydrocarbon.

The Michael reaction can be smoothly conducted in the presence of an acidic compound such as a mineral acid, e.g., sulfuric acid and nitric acid. However, the reaction times involved are usually longer in an acidic medium than in an alkaline medium. The reaction is preferably conducted in the presence of alkaline compounds such as alkali metal hydroxides, alkali metal carbonates, alkali metal bicarbonates, alkali metal alkoxides, piperidine and benzyl-trimethylammonium hydroxide. The best reaction medium is an aqueous alkaline medium.

If the reaction temperature is too low, the reaction rate is too low and the cooling procedures are complicated. If the reaction temperature is too high, the acryloyl groups may radically polymerize. Suitable reaction temperatures range from 0–200° C., preferably 20–100° C., especially 30–80° C.

In order to inhibit the polymerization of the acryloyl groups in the reaction, radical polymerization inhibitors are preferably added. As indicated earlier, if the number of equivalents of the acryloyl compound is greater than the number of equivalents of the amino acid such that $AX>BY$, then the unreacted acryloyl groups of the polymer are reacted with a compound containing at least three hydrogen atoms active in the Michael addition reaction. Suitable compounds include polyalcohols, polythiols, aminoalcohols, polyamines and substituted polyamines such as ethylenediamine, propylenediamine, hexamethylenediamine, diethylenetriamine, triethylenetetramine, tetraethylene-pentamine, pentaethylenehexamine; phenylenediamine, N-methylethylenediamine, N-methylpropylenediamine; polyols such as glycerine, sorbitol; thiols such as 1,2-dimercaptopropanol; aminoalcohols such as monoethanolamine, diethanolamine; aminothiol such as 2-aminoethane thiol; and ammonia.

When the addition polymer of this invention is modified by the incorporation of said compound, the polymerization reaction may be conducted in two steps in which the acryloyl compound is first reacted with the amino acid, and then the resulting polymer is reacted with the compound containing at least three hydrogen atoms reacted in the Michael addition reaction. Alternatively, the three reaction components may be reacted at the same time, although the order of addition is not important.

If an excess of the acryloyl compound is reacted with the amino acid to yield an addition polymer containing unreacted acryloyl groups and then the addition polymer is radical polymerized, the radical polymerization is conducted in the presence of a radical polymerization catalyst and, if necessary, together with a comonomer, with or without separating the addition polymer from the reaction mixture.

Suitable comonomers include vinyl compounds which can copolymerize with compounds containing acryl groups such as acrylamide, methacrylamide, acrylic esters, methacrylic esters, acrylic acid, methacrylic acid, and styrene and vinylacetate. Suitable radical polymerization catalysts include initiator catalysts such as persulfate, peroxide and benzoylperoxide.

The amounts of the acryloyl compound and the amino acid used in the reaction are defined as follows. If a water soluble addition polymer is desired, essentially equimolar amounts of both compounds are preferably used. If a water insoluble addition polymer is desired, the molar ratio and the number of active groups of the compounds should be selected so as to be substantially equal, i.e., $AX=BY$. However, if a water insoluble addition polymer is obtained by an addition radical-polymerization reaction or by a Michael reaction, it is necessary to add an excess of the acryloyl compound. Thus, the value of the ratio $AX/BY$ desired is greater than 1, preferably greater than 1.2, and especially greater than 1.5, from the viewpoint of cross-linking density. However, if the value of $AX/BY$ is too large, the number of amino acid units per unit weight of the resulting addition polymer is too small. In view of these limitations, an optimum value for the ratio is selected which usually is less than 10, preferably less than 5.

As indicated earlier, the addition polymers of this invention have nitrogen atoms and carbonyl carbon atoms on the polymer chain with carboxyl groups near the nitrogen atoms (corresponding to the positions of amino group and carboxyl group of the amino acid). This is the basic characteristic of the polymer. It is not completely clear why the addition polymers of this invention are capable of removing heavy metal ions. However, it is felt that the chelating ability of the polymer is based on the structure of the amino acids.

The processes for removing heavy metal ions from aqueous solutions using the addition polymer of this invention are illustrated as follows. If a water soluble polymer is used, a solution containing an amount of polymer in excess of the equilibrium value needed to complex the heavy metal ions is added to the aqueous solution containing the heavy metal ions so as to precipitate the coordinated heavy metal ions. If copper ions are treated in this manner, the characteristic blue color of amino acid-copper complexes is imparted to the precipitates.

In the mechanism of the formation of precipitates of the water soluble addition polymer with the heavy metal ions, the amino acids of the polymer have a relatively high chelate formation constant. Each amino acid residue of the polymer has two coordination sites per amino acid group. However, the heavy metal ions have a coordination number of 4 or 5. Thus, two or three amino acid molecules coordinate with one heavy metal ion. In the coordination of the heavy metal ions, some ions coordinate with amino acid residues on different polymer chains, thereby resulting in a type of cross-linking which occurs through the heavy metal ions. These factors are the reasons why water insoluble metal chelated polymers are formed.

In order to remove the heavy metal ions from the chelated addition polymer, the chelated polymer is suspended in water and treated with a mineral acid such as hydrochloric acid until the solution is acidic. The suspension is stirred until the un-chelated addition polymer is redissolved and the heavy metal ions are separated in the form of salts thereof, in water. Alcohol or acetone is added to the resulting solution and the chelated addition polymer is precipitated again. However, the heavy metal ions dissolve as salts in the filtrate, rendering it possible to separate and recover the addition polymer.

When the addition polymer is a water insoluble polymer, the polymer may be used as a powder or in some other form. The addition polymer is also prepared as a ball pellet resin similar to an ion-exchange resin by reacting the compounds in a suspension of an aqueous solution containing the starting materials in an inert organic solvent, which is not miscible with water and does not dissolve the starting material in comparison to water. The fact that the resulting addition polymer has chelating properties can be confirmed as follows.

In accordance with typical measurement procedures used for ion-exchange resins, the addition polymer is packed in a column and an aqueous solution containing the heavy metal ions is poured into the column, whereby the heavy metal ions corresponding to the molar ratio of the amino acid of the addition polymer are adsorbed. If a solution containing copper ions is passed through a column containing a water soluble addition polymer, it is found that coloring begins at the top of the column and the colored region progressively enlarges, depending upon the flow rate of the aqueous solution.

In order to remove the heavy metal ions from the resin adsorbing them, the heavy metal ions can be easily eluted by passing an aqueous acidic solution containing a mineral acid such as hydrochloric acid through the column. Whether a water soluble or an insoluble polymer is used, the process for removing heavy metals from an aqueous medium is the same in the following aspects. That is, the step of contacting the aqueous medium containing the heavy metals with the chelating amino acid addition polymer of the present invention and the step of separating the aqueous medium and said polymer chelated by the heavy metals, wherein the chelated polymer is treated with an acidic solution to restore its chelating ability for further use of the polymer. The chelating amino acid addition polymer of this invention adsorbs metals possessing high chelate formation constants, such as iron, nickel, cobalt, lead, cadmium, mercury, rhodium and palladium, and the like, as well as copper. Thus, a useful chelating amino acid addition polymer is provided which selectively adsorbs heavy metal ions from an aqueous solution without affecting other ions.

Having generally described the invention, a more complete understanding can be obtained by reference to certain specific Examples, which are provided herein for purposes of illustration only and are not intended to be limiting unless otherwise specified.

EXAMPLE 1

Into a 100 cc. four-necked flask equipped with a thermometer, a stirrer, a dropping funnel, a drier and a condenser, 3.08 g. of methylene-bisacrylamide was added and stirred at 45° C. A solution of 1.50 g. of glycine and 0.80 g. of sodium hydroxide in 14.6 g. of water was added to the compound in the flask and the mixture was reacted at 45° C. for 5 hours. In accordance with analytical techniques which measured the decreases in the double bond content of the product, the conversion to polymer product was 86.5%. The reaction mixture was poured into a large amount of acetone to precipitate a white polymer. The polymer was dried under a reduced pressure to yield 4.98 g. of the dried polymer. The dried polymer was a white polymer having high hygroscopic properties. A 1% aqueous solution containing 10 g. of the polymer was added to 10 g. of a 1% cupric sulfate solution to precipitate a deep blue colored polymer. The precipitate was insoluble in water and organic solvents and was not hygroscopic.

EXAMPLE 2

In accordance with the process of Example 1, a solution of 1.78 g. of β-alanine, 0.80 g. of sodium hydroxide in 5.7 g. of water was added to 3.08 g. of methylenebisacrylamide, and the mixture was reacted at 60° C. for 3 hours. In accordance with analytical techniques which measured the decrease in the double bond content of the product, the conversion to polymer product was 93.9%.

The reaction mixture was added to a large amount of acetone to yield a white polymer. The polymer was dried under a reduced pressure to yield 5.1 g. of the dried polymer. The dried polymer had high hygroscopic properties and was mixed with a 1% aqueous cupric sulfate solution to precipitate a deep blue colored polymer the same as in Example 1.

EXAMPLE 3

In accordance with the process of Example 1, a solution of 2.94 g. of L-glutamic acid, 1.6 g. of sodium hydroxide in 7.7 g. of water, was added to 3.08 g. of methylene bisacrylamide, and the mixture was reacted at 80° C. for 5 hours. In accordance with analytical techniques which measured the decrease in the double bond content of the product, the conversion to product was 59.5%. The reaction mixture was added to a large amount of acetone to yield a white polymer. The polymer was mixed with a 1% aqueous cupric sulfate solution to precipitate a clear, deep blue polymer the same as in Example 1.

EXAMPLE 4

Into a 100 cc. four-necked flask equipped with a thermometer, a stirrer, a dropping funnel, and a condenser, 3.08 g. of methylenebisacrylamide was added and was stirred at 50° C. A solution of 1.83 g. of L-lysine monohydrochloride and 0.80 g. of sodium hydroxide in 5.8 g. of water was added to the compound in the flask, and the mixture was reacted at 50° C. for 30 minutes to transform a transparent viscous solution into a gelled product. The gelled product was further reacted for 1 hour and was removed from the flask, washed with water, washed with methanol, and then filtered. The filtered gelled product was ground in a mortar, and then dried in a reduced pressure drier. The dried gelled product was a white powder obtained in a yield of 4.5 g. A 2.0 g. quantity of the resulting product (a carboxyl group content of $3.51 \times 10^{-3}$ mole) was packed in a column and was washed with water. To the column was added 10 cc. of a 1% aqueous cupric sulfate solution (a pale blue solution containing a copper ion content of $4.01 \times 10^{-4}$ mole) into the top of the column. As the copper solution passed through the polymer, it changed to a deep blue color, indicating the formation of copper chelates within the polymer. The water eluted from the column was colorless and transparent. An EDTA titration of the eluted aqueous solution indicated that no copper was present. When a large amount of an aqueous 1N-hydrochloric acid solution was poured into the top of the column, the polymer became colorless and the aqueous solution passing through the column was a blue color, which was confirmed to contain copper ion. The operation could be repeated.

EXAMPLE 5

In accordance with the process and the apparatus of Example 4, 3.08 g. of methylene bisacrylamide was stirred at 50° C. A solution of 1.685 g. of ornithine hydrochloride and 0.80 g. of sodium hydroxide in 5.6 g. of water was added to the compound. The mixture was reacted at 50° C. for 10 minutes to transform a transparent viscous solution into a gelled product. The gelled product was further reacted for 1 hour, and a white powder was obtained by the procedure described in Example 4 in a yield of 4.3 g.

As further described in Example 4, 2.0 g. of the polymer product (a carboxyl group content of $3.59 \times 10^{-3}$ mole) was packed in a column, washed with water and exposed to 10 cc of a 1% aqueous cupric sulfate solution (a pale blue solution containing a copper ion content of $4.01 \times 10^{-4}$ mole) from the top of the column. The polymer was changed to a deep blue color by the chelating copper ion, and the aqueous solution passed from the column was colorless and transparent. An EDTA titration of the eluted aqueous solution indicated that no copper was present When the polymer which had adsorbed the copper ion was treated with hydrochloric acid, the polymer became colorless and the product was recovered.

EXAMPLE 6

Into a 100 ml. four-necked flask equipped with a thermometer, a stirrer, and a condenser, 3.25 g. of hexahydro-1,3,5-triacryloyl-s-triazine and 11.17 g. of methanol were added, and the flask was dipped into a water bath at 40° C. A solution of 1.47 g. of glycine and 0.78 g. of sodium hydroxide in 3.14 g. of water was added to the compounds, and the mixture was reacted for about 15 minutes in a water bath at about 40° C. The reaction mixture became a solid. After 20–30 minutes reaction, the reaction mixture was removed from the flask, washed with water and methanol and dried to yield 5.01 g. of the product. A 2.0 g. quantity of the product was packed in the column, and 10 cc. of a 1% aqueous cupric sulfate solution was poured into the column. The polymer changed to a deep blue color as chelate complexes formed within the polymer. The aqueous solution passed through the column was colorless and transparent. The product was recovered as described in Example 4.

EXAMPLE 7

In accordance with the process and apparatus of Example 4, 2.93 g. of ethyleneglycol diacrylate and 2.9 g. of dimethylformamide were added to a flask and stirred. A solution of 1.55 g. of L-lysine monohydrochloride and 0.66 g. of sodium hydroxide in 3.2 g. of water was added to the contents of the flask. The contents exothermically reacted to transform a transparent viscous solution into a gelled product several minutes after the addition of the reactants. The reaction mixture was further stirred for 10 minutes and the reaction mixture was removed from the flask and was ground in a mortar. The mixture was neutralized with 17 ml. of 1N-hydrochloric acid and, as outlined in Example 4, 4.2 g. of a white powder product was obtained. The process of Example 4 confirmed that the product had chelating properties.

EXAMPLE 8

Into a 100 cc. four-necked flask equipped with a thermometer, a stirrer, a dropping funnel and a condenser, 3.08 g. of methylene bisacrylamide was added and was stirred at 80° C. A solution of 0.75 g. of glycine and 0.4 g. of sodium hydroxide in 8.3 g. of water, was added to the contents of the flask, and the mixture was reacted at 80° C. for 3 hours. A mixture of 0.58 g. of hexamethylene diamine in 4 g. of water was added dropwise to the reaction mixture. The reaction mixture became a gel via a transparent viscous solution 20 minutes after addition of the reactants. A 30 g. quantity of water was added to the product, and it was stirred for 1 hour to grind the gelled product. The resulting product was filtered, washed with water, washed with methanol and then dried under a reduced pressure. The resulting product was a white powder obtained in a yield of 4.3 g. The product was packed in a column having an inner diameter of 15 mm. and was washed with water. When 10 cc. of a 1% cupric sulfate solution was poured into the top of the column, the polymer changed to a deep blue color as the copper ions were chelated. The aqueous solution which had passed through the column was colorless and transparent. An EDTA titration of the aqueous solution eluted revealed the absence of copper ion. When a large amount of a 1 N aqueous HCl solution was poured into the top of the column, the polymer became colorless, and the aqueous solution which had passed through the column was a pale blue color confirming the presence of copper ion. The polymer was recovered and the operation could be repeated.

EXAMPLE 9

In the apparatus of Example 8, 3.08 g. of methylene biscrylamide, 0.75 g. of glycine, 0.4 g. of sodium hydroxide, and 8.3 g. of water were added and reacted at 80° C. for 3 hours. To this solution was added dropwise a solution of 0.52 g. of 2-amino-ethanethiol in 4 g. of water. A gelled product was obtained by reacting them at 80° C. for 5 hours. The product was dried, ground, washed with water, washed with methanol and then dried under a reduced pressure to yield 4.2 g. of a white powder. The polymer possessed selective chelating properties as determined by the procedure of Example 8.

EXAMPLE 10

Into the apparatus of Example 8, a solution of 3.4 g. of ethyleneglycol diacrylate, 3.5 g. of dimethylformamide and 1.19 g. of α-alanine in 3.2 g. of water was added.

An aqueous solution of 10 g. of 10% benzyl trimethylammonium hydroxide was added dropwise to the solution at 40° C. and the mixture was stirred at 40° C. for 30 minutes. To the mixture was added 0.3 g. of a 27% ammonia solution and the mixture was reacted at 40° C. for 60 minutes to yield a gelled product. The product was dried, ground, washed with water, further washed with methanol and then dried to yield 4.9 g. of a white powder. The polymer possessed chelating properties as determined by the procedure of Example 8.

EXAMPLE 11

Into a 100 cc. four-necked flask equipped with a thermometer, a stirrer, a dropping funnel and a condenser, 3.08 g. of methylene bisacrylamide was added and stirred at 80° C. A solution of 0.75 g. of glycine and 0.4 g. of sodium hydroxide in 8.3 g. of water was added to the compound in the flask and was reacted at 80° C. for 3 hours. In addition, a solution of 0.5 g. of acrylamide was added to the reaction mixture with stirring, and then 4.5 g. of an aqueous solution of 0.01 g. of ammonium persulfate was added dropwise to the mixture. The reaction mixture gelled 5 minutes after the addition of the persulfate. A 30 g. quantity of water was added and the mixture was stirred for 1 hour to grind the gelled product. The resulting product was filtered, washed with water and with methanol, and then dried in a reduced pressure drier. The dried, gelled product was obtained as a white powder in a yield of 4.2 g.

A 2.0 g. quantity of the powdery polymer (a carboxyl group content of $4.38 \times 10^{-3}$ mole) was packed in a column having an inner diameter of 15 mm. and was washed with water. A 10 cc. quantity of a 1% cupric sulfate solution ($4.01 \times 10^{-4}$ mole copper content) was poured into the top of the column, over a period of 5 minutes. The polymer formed chelated complexes with copper ion which resulted in the formation of a deep blue color in the polymer and the water. The aqueous solution eluted from the column was colorless and transparent. An EDTA titration of the aqueous solution eluted revealed the absence of copper ion. A large amount of a 1 N aqueous HCl solution was poured into the top of the column. The polymer became colorless, and the aqueous solution discharged was a pale blue color. Further testing confirmed the presence of copper ion in the solution. As in all of the other Examples, the polymer was recovered and reused.

Having now fully described the invention, it will be apparent to one of ordinary skill in the art that many changes and modifications can be made thereto without departing from the spirit or scope of the invention as set forth herein. Accordingly,

What is claimed and intended to be covered by Letters Patent is:

1. A chelating amino acid addition polymer obtained by a process which comprises reacting an acryloyl compound containing at least two acryloyl groups, wherein the acryloyl compound is selected from the group consisting of alkylene bisacryl-amides, alkylene bismethacryl-amides, methylene bisacryl-amides, methylene bismethacryl-amides, dihydroxy alkylene bisacryl-amide, dihydroxy alkylene bismethacryl-amide, alkyleneglycol diacrylates, alkyleneglycol dimethacrylates, alkylenepolyol polyacrylates, bisacrylamidomethylimidazolidone, alkylenepolyol polymethacrylates and hexahydro - s - triazine derivatives containing at least two acryloyl groups at any two of the 1, 3 and 5-positions with an amino acid containing at least two active hydrogen atoms of which two are bonded to the nitrogen atom of the amino acid, wherein the amino acid is selected from the group consisting of glycine, α-alanine, glutamic acid, aspartic acid, β-alanine, N,N- (or N,N'-) dimethyl lysine, ethylene diamine-N,N- or (N,N'-) diacetic acid, N,N-bis (hydroxyethyl) glycine, lysine, alginine, ornithine, threonine, cysteine and serine.

2. The polymer of Claim 1, wherein said acryloyl compound contains two acryloyl groups, and the amino acid contains two active hydrogen atoms.

3. The polymer of Claim 1, wherein said acryloyl compound contains at least three acryloyl groups or said amino acid contains at least three active hydrogen atoms.

4. The polymer of Claim 1, wherein the product (AX) of (A) moles of said acryloyl compound containing (X) number of acryloyl groups is greater than the product (BY) of (B) moles of said amino acid containing (Y) number of active hydrogen atoms bonded to the nitrogen atom.

5. The polymer of Claim 1, wherein said addition polymer contains unreacted acryloyl groups.

6. The polymer of Claim 1, wherein said acryloyl compound is selected from the group consisting of methylene bisacryl-amide, methylene bismethacryl-amide, dihydroxyethylene bisacryl-amide, dihydroxyethylene bismethacryl-amide, ethyleneglycol diacrylate, ethyleneglycol dimethacrylate, glycerine trisacrylate, glycerine trismethacrylate and hexahydro-1,3,5-triacryloyl-s-triazine.

7. The polymer of Claim 1, wherein the reaction of said acryloyl compound with said amino acid is conducted in the presence of an acid or an alkaline catalyst in an aqueous medium.

8. The polymer of Claim 1, wherein the reaction of said acryloyl compound with said amino acid is conducted at a temperature of 0–200° C.

No references cited.

MELVIN GOLDSTEIN, Primary Examiner.

U.S. Cl. X.R.

260—78 A